Feb. 15, 1949.                L. W. LOVETT ET AL                2,461,647
               APPARATUS FOR APPLYING PLASTIC MATERIAL TO CABLES
Filed May 31, 1946                                          7 Sheets-Sheet 2
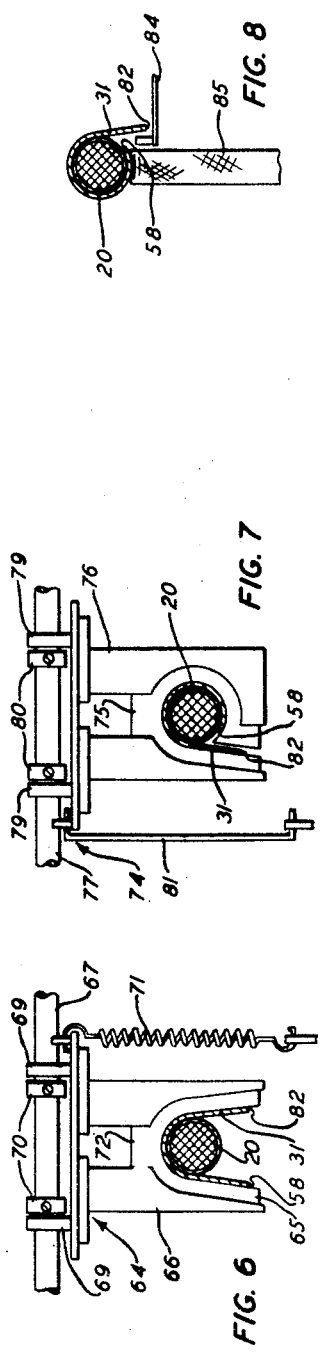
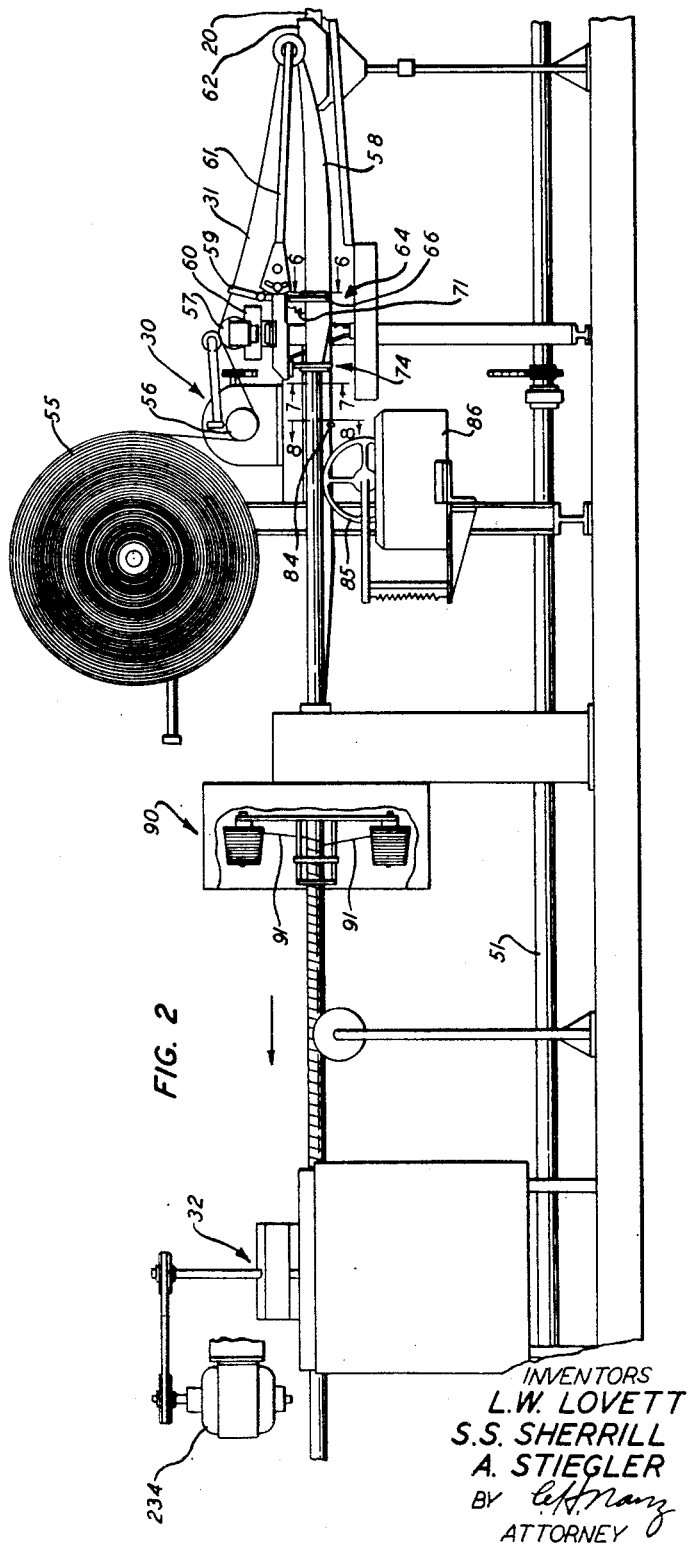
INVENTORS
L. W. LOVETT
S. S. SHERRILL
A. STIEGLER
ATTORNEY

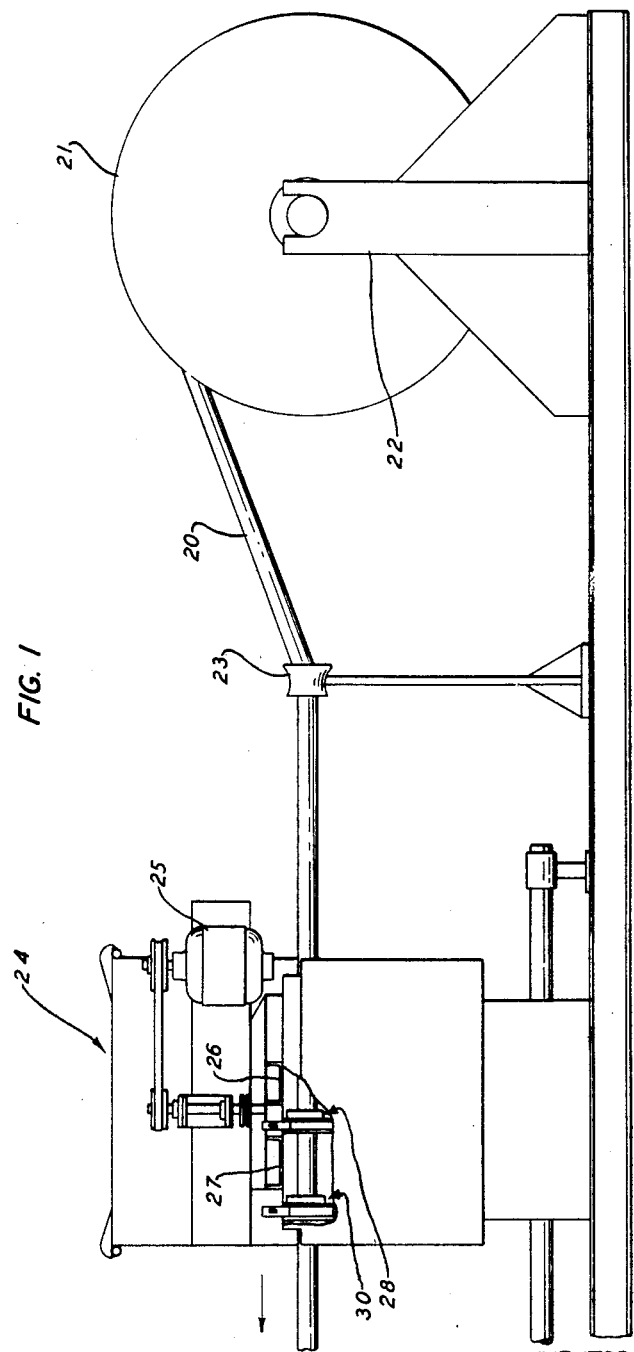

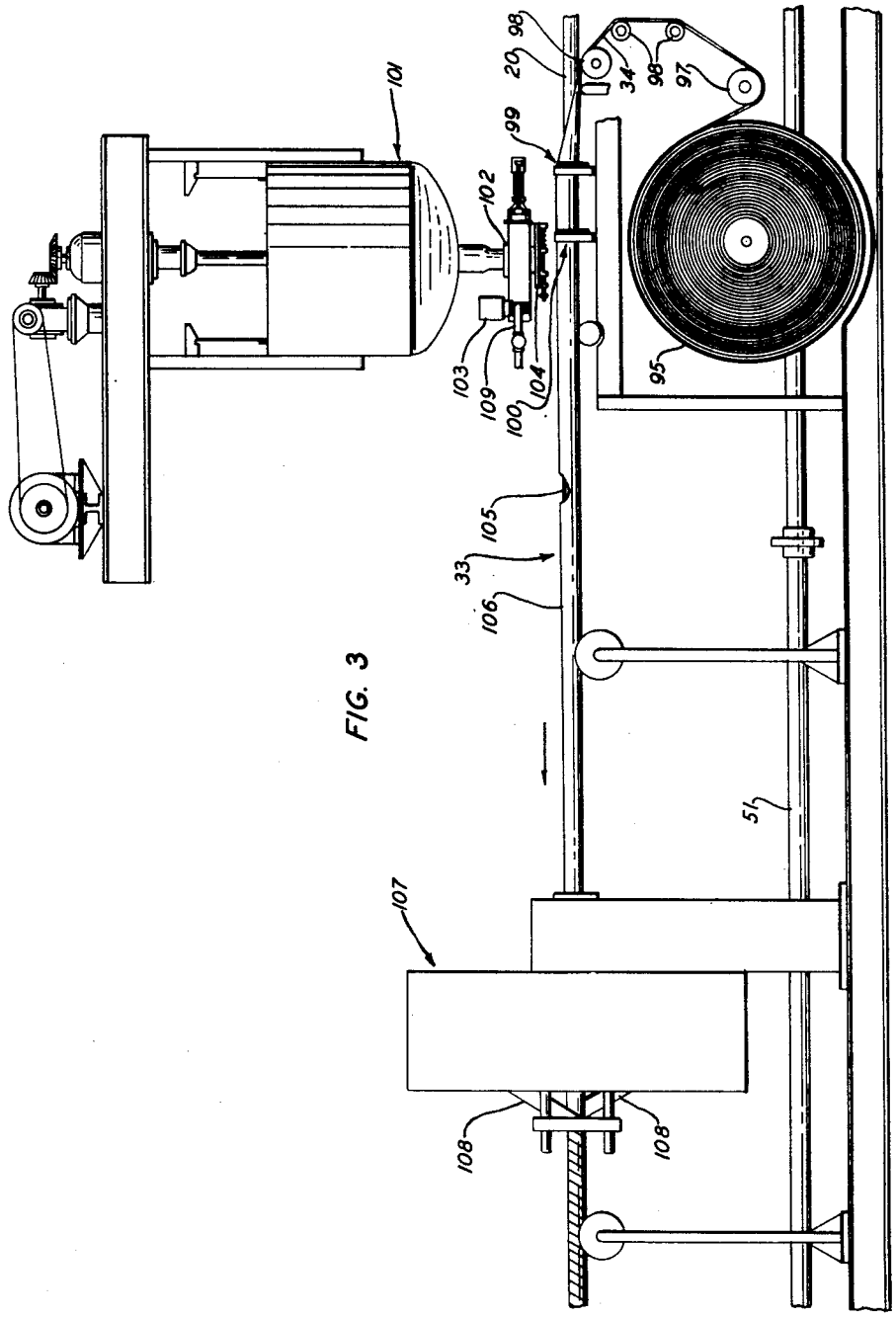

Feb. 15, 1949.  L. W. LOVETT ET AL  2,461,647
APPARATUS FOR APPLYING PLASTIC MATERIAL TO CABLES
Filed May 31, 1946  7 Sheets-Sheet 4

INVENTORS
L.W. LOVETT
S.S. SHERRILL
A. STIEGLER
BY
ATTORNEY

Feb. 15, 1949.  L. W. LOVETT ET AL  2,461,647
APPARATUS FOR APPLYING PLASTIC MATERIAL TO CABLES
Filed May 31, 1946  7 Sheets-Sheet 5

INVENTORS
L.W. LOVETT
S.S. SHERRILL
A. STIEGLER
BY
ATTORNEY

Feb. 15, 1949.　　　L. W. LOVETT ET AL　　　2,461,647
APPARATUS FOR APPLYING PLASTIC MATERIAL TO CABLES
Filed May 31, 1946　　　　　　　　　　　　　　7 Sheets-Sheet 6

INVENTORS
L.W. LOVETT
S.S. SHERRILL
A. STIEGLER
BY
ATTORNEY

Feb. 15, 1949.　　L. W. LOVETT ET AL　　2,461,647
APPARATUS FOR APPLYING PLASTIC MATERIAL TO CABLES
Filed May 31, 1946　　7 Sheets-Sheet 7

INVENTORS
L.W. LOVETT
S.S. SHERRILL
A. STIEGLER
BY
ATTORNEY

Patented Feb. 15, 1949

2,461,647

UNITED STATES PATENT OFFICE 2,461,647

APPARATUS FOR APPLYING PLASTIC MATERIAL TO CABLES

Leroy W. Lovett and Sloan S. Sherrill, Baltimore, and August Stiegler, Towson, Md., assignors to Western Electric Company, Incorporated, New York, N. Y., a corporation of New York Application May 31, 1946, Serial No. 673,580

3 Claims. (Cl. 91—43)

This invention relates to apparatus for applying plastic material to cables and has for its object the provision of new and improved apparatus for applying plastic material to cables.

One apparatus embodying the invention includes a melting kettle for melting viscous thermoplastic cement and having a discharge conduit leading into a steam-jacketed screw conveyer. The screw conveyer agitates and propels the thermoplastic cement through a cleanable strainer to a steam-jacketed constant displacement pump. The constant displacement pump forces the cement at a uniform rate of flow through a filter and through a valve positioned above a cable being advanced with respect thereto.

A complete understanding of the invention may be obtained from the following detailed description of methods and apparatus forming specific embodiments thereof, when read in conjunction with the appended drawings, in which:

Fig. 1 is a side elevation of a portion of an apparatus constituting a specific embodiment of the invention;

Fig. 2 is a side elevation of another portion of the apparatus;

Fig. 3 is a side elevation of still another portion of the apparatus having parts thereof broken away;

Fig. 6 is an enlarged, fragmentary, vertical section taken along line 6—6 of Fig. 2;

Fig. 7 is an enlarged, fragmentary, vertical section taken alone line 7—7 of Fig. 2;

Fig. 8 is an enlarged, fragmentary, vertical section taken along line 8—8 of Fig. 2;

Figure 4:
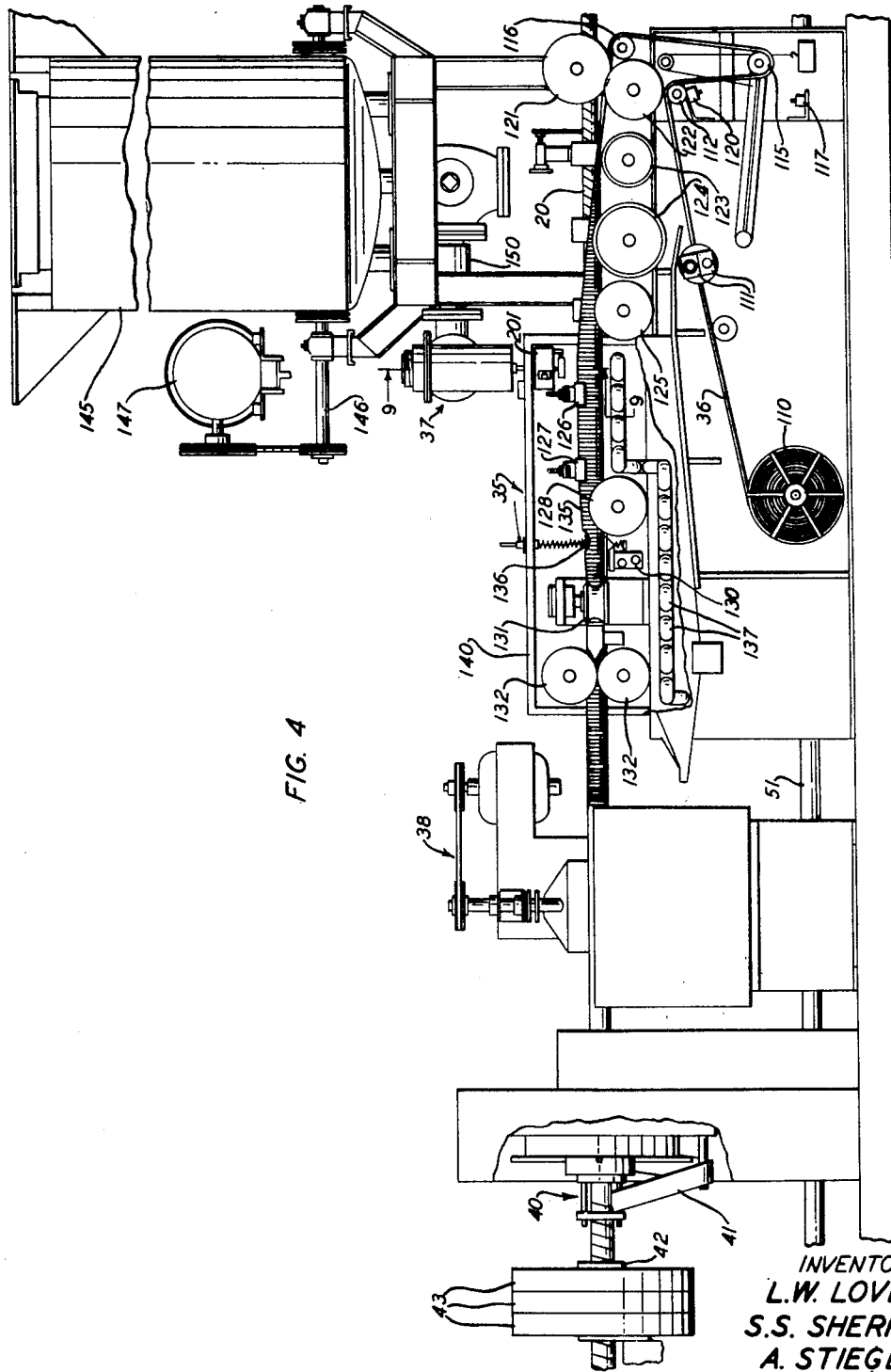
Fig. 4 is a side elevation of an additional portion of the apparatus showing parts thereof in section.

Referring now in detail to the drawings, a lead-sheathed cable 20 having a previously applied coating of tallow on the outer surface thereof is advanced toward the left, as viewed in Fig. 1, from a supply reel 21 mounted on a supply stand 22. The cable passes through a bellmouth 23 through a cleaning and coating flooding tank 24, the operation of which is disclosed fully and claimed in copending application Serial No. 671,838, filed May 23, 1946. The flooding tank 24 includes an electric motor 25, which drives a pump (not shown) to pump hot thermoplastic cement upon the cable through troughs 26 and 27. The hot cement applied to the cable by the trough 26 melts the tallow and a tight wiper 28 wipes the cement and the melted tallow from the periphery of the cable. The hot cement flowing through the trough 27 then covers the wiped periphery of the cable and the excess thereof is wiped from the cable by a relatively loose wiper 29. The tallow on the cable is completely removed from the cable by the hot cement applied by the trough 26 and the wiping action of the tight wiper 28 so that the tallow does not prevent adhesion between the cement applied by the trough 27 and the cable.

The cable 20 passes from the flooding tank 24 to a tape applicator 30, which applies an insulating tape 31 formed of thermoplastic material longitudinally upon the cable. The tape 31 and the cable then pass through a flooding tank 32 of a second tape applicator 33. The flooding tank 32 is of standard construction and applies hot thermoplastic cement to the exterior of the thermoplastic tape 31. The cable as thus built up is advanced from the flooder 32 on through the remainder of the second tape applicator 33, which applies a thermoplastic tape 34 longitudinally upon the cable. The tape applicators 30 and 33 are disclosed in detail and claimed in copending application Serial No. 671,835, filed May 23, 1946.

The covered cable then travels through a corrugating and forming device 35, which corrugates a copper strip 36 and forms the corrugated strip around the cable. A thermoplastic cement applicator 37 applies thermoplastic cement into the partially formed copper strip just before the strip is completely formed around the cable.

The cable thus built up is advanced through a flooding tank 38, identical with the flooding tank 32, which applies hot asphalt to the exterior of the formed copper strip. A tape 41 formed of protective material, for example impregnated burlap, is applied to the continuously moving cable by a serving head 40 of a suitable type, which carries a supply pad 44 of the tape 41. A holder 39 serves to hold extra pads 43—43 of the tape 41 in positions over the cable so that they may be used when the tape pad 44 is exhausted.

The taped cable 20 is advanced from the serving head 40 through a flooding tank 42, which is identical with the above-mentioned flooding tanks 32 and 38, and the flooding tank 42 applies hot asphalt to the exterior of the tape 41. A capstan 45 advances the cable from the flooding tank 42 through a whiting pit 46 containing a suspension of whiting, in which the cable 20 is coated with whiting, and finally the cable is wound upon a reel 47 driven by rollers 50—50.

The tape applicators 30 and 33, the corrugating and forming device 35, the cement applicator 37, the serving head 40 and the capstan 45 are all driven by a line shaft 51, which is rotated by a main electric motor 52 through suitable gears (not shown). The cement applicator 37 is driven through a variable gear box so that its speed can be varied with respect to that of the capstan to coordinate their operations.

As the cable 20 is advanced through the tape applicator 30, the thermoplastic tape 31 is advanced from a tape supply pad 55 by means of an overrunning drive roll 56, which tends to advance the tape 31 from the supply pad 55 at a rate of speed greater than that at which the tape is applied to the cable and thereby prevents stretching of the tape 31. The tape 31 is advanced from the drive roll 56 over a lubricating roll 57, which dips into a tank 60 containing a supply of lubricant, such as a mixture of rosin oil and turpentine, or the like, and the roll 57 coats the outer surface of the tape 31 with the lubricant except for the portion thereof near the edge 58 of the tape which is not coated with the lubricant. An adjustable guide 59 guides the tape 31 so that the portion of the exterior surface of the tape 31 near the edge 58 thereof extends beyond and is not contacted by the lubricating roll 57.

The tape 31 travels from the roll 57 over a vertically adjustable guide 61 and back over a supporting guide 62, which holds the tape 31 out of contact with the cement-covered cable. The cable 20 and the tape 31 are advanced through a former 64 (Fig. 6) having a replaceable semihard rubber forming insert 65 positioned within a holder 66 thereof. The forming insert 65 forms the flat tape 31 into a trough-like member having a cross section the shape of a U, and simultaneously presses the tape 31 into contact with the cemented cable 20. The lubricant applied to the outer surface of the tape 31 eliminates undue friction between the forming insert 65 and the tape 31 so that little or no stretch is created in the tape 31 as it is continuously drawn through the former 64. Since the tape 31 does not contact the cement-covered cable until the tape enters the former 64, any stretching of the tape does not cause wrinkles therein which might be formed if the tape should contact the cable before the tape enters the former 64.

The holder 66 is pivotally mounted on a rod 67 by lugs 69—69, and is held against undue lateral movement by collars 70—70 fastened adjustably to the rod 67. However, slight clearances between the collars 70—70 and the lugs 69—69 permit the former 64 to float laterally with the cable. A tension spring 71 serves to urge the holder 66 and the insert 65 downwardly, as viewed in Fig. 6, so that the forming insert 65 presses the tape 31 against the upper portion of the cable 20.

The half of the tape 31 adjacent to the edge 58 (Figs. 2 and 7) thereof then is wrapped tightly against the cement-covered cable 20 by a former 74, which includes a replaceable semihard rubber forming insert 75 held in a holder 76, which is held on a rod 77 by lugs 79—79 bracketing collars 80—80 fastened adjustably to the rod 77, and a rod 81. The collars 80—80 may be loosened on the rod 77 to permit lateral adjustment of the holder 76 with respect to the cable 20, and are so spaced that the holder 74 may float laterally with the cable.

The tape 31 and the cable 20 travel from the former 76 past a resiliently mounted blunt guide 84 and over a spring-pressed applicator wheel 85, which dips into a tank 86 having thermoplastic cement therein and applies the cement to the unlubricated portion of the outer surface of the tape 31 adjacent to the edge 58 thereof. The guide 84 holds an edge 82 of the tape 31 outwardly so that it does not contact the wheel 85, whereby damage to the tape 31 is prevented. The periphery of the wheel 85 is concave so that it conforms to the shape of the portion of the tape 31 adjacent to the edge 58 thereof. Also, the periphery of the wheel 85 is knurled slightly so that slippage between the wheel and the tape 31 is prevented.

Figure 5:
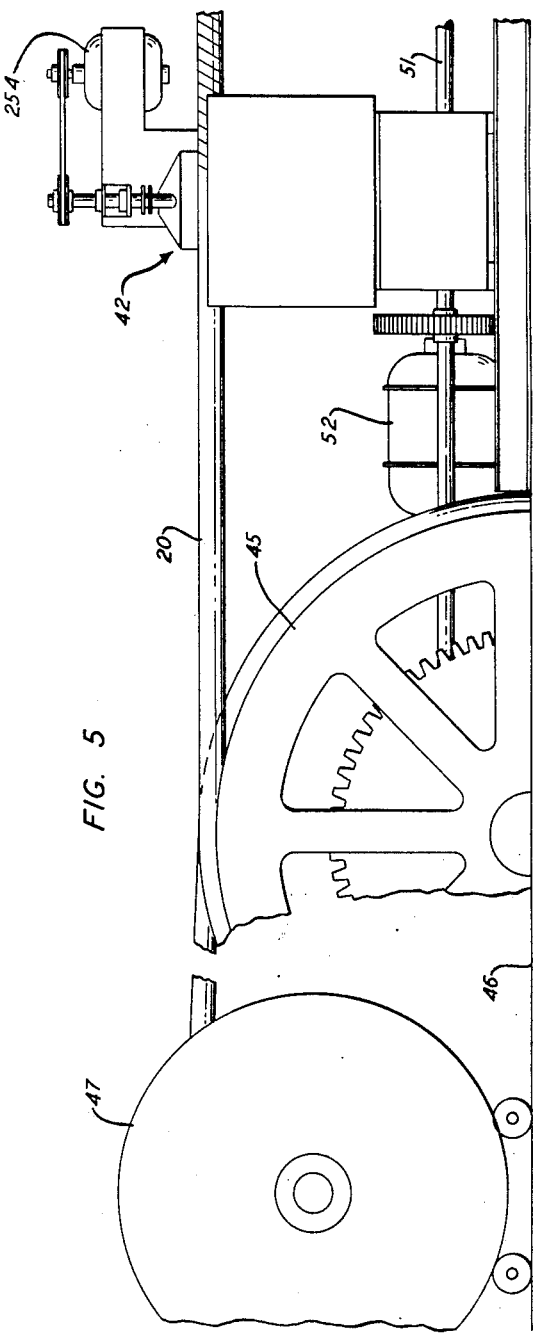
Fig. 5 is a fragmentary, side elevation of a further portion of the apparatus.

After passing over the applicator wheel 85, the tape 31 and the cable 20 pass through a serving head 90 (Fig. 2) of the tape applicator 30, which is driven by the line shaft 51 in synchronization with the speed of the capstan 45 (Fig. 5). The serving head 90 winds textile cords 91—91 around the tape 31 in a clockwise direction, as viewed in Fig. 8, to lap the edge 82 of the tape 31 over the cemented portion of the tape 31 near the edge 58 thereof, to bind the tape 31 tightly against the cement-covered cable and to bind the edge 82 against the cemented portion of the outer surface of this tape so that a moistureproof seal is formed therebetween. The cords 91—91 also serve to hold the tape 31 tightly against the cable 20 so that it is stuck thereto by the cement. The cords may be composed of a high strength plastic material rather than textile material if so desired. The cable thus built up travels from the serving head 90 to the flooding tank 32, which completely coats the outer portion of the tape 31 and impregnates the textile cords 91—91 with a thermoplastic waterproofing and electrically insulating cement.

The cable 20 travels from the flooding tank 32 of the tape applicator 33 (Fig. 3) on through the tape applicator 33, which applies the thermoplastic tape 34 thereto. The tape 34 is advanced from a tape supply pad 95 under an overrunning drive roll 97. The tape 34 travels from the drive roll 97 over guide rolls 98—98 and a lubricating roll 96 to a position spaced slightly below the cable 20. The tape 34 and the cable 20 are drawn continuously through a former 99, which is identical in shape with the former 64 (Fig. 6) except that the former 99 is inverted with respect to the former 64, and through a former 100 (Fig. 3), which is identical in shape with the former 74 (Fig. 7) except that the former 100 is reversed with respect to the former 74. The former 99 presses the tape 34 into contact with the cement-covered cable, and forms the tape 34 in such a manner that the tape is the shape of an inverted U in cross section with the mouth of the U pointing upwardly, as viewed in Fig. 3. The former 100 presses the half of the tape 34 adjacent to an edge 105 thereof tightly against the cable 20 to stick that portion of the tape 34 to the cable but holds an edge 106 away from the edge 105 and the cable.

The tape 34 and the cable 20 then are advanced from the former 100 beneath a thermoplastic cement applicator 101, which is disclosed completely and claimed in copending application Serial No. 671,837, filed May 23, 1946. The cement applicator, which includes an air operated valve 102 controlled by an air valve 109 actuated by a solenoid 103, discharges a small stream of thermoplastic cement at a constant rate through the valve 102 and a flow-control valve 104 upon the portion of the tape 34 near the edge 105 thereof. The cable 20 with the tape 34 formed partially around and stuck thereto is advanced from under the cement applicator 101 to and through a serving head 105 of the tape applicator 33, which serving head is of a well-known type.

The serving head 105 is driven by the line shaft 51 in synchronization with the speed of the capstan 45 (Fig. 5), and wraps tapes 106—106 (Fig. 3), composed of impregnated fabric, paper or other suitable insulating materials, around the thermoplastic tape 34 in a counterclockwise direction, as viewed from the left end of the serving head 107, as seen in Fig. 3. As the tapes 108—108 are served upon the thermoplastic tape 34, they wrap the edge 106 of the tape 34 over the cemented edge 105 thereof, and press them tightly together whereby the edge 105 is cemented and sealed to the edge 106. The tapes 108—108 also press the tape 34 tightly against the cement-covered cable 20 so that the tape 34 is sealed thereto, and since they are wound upon the tape 34 in a direction tending to wrap the edge 106 of the tape 34 over the edge 105 thereof, any wrinkles in the tape 34 are prevented. In addition to these functions, the tapes 108—108 serve as mechanical protection for the thermosplastic tapes 31 and 34.

The cable 20, including the coverings thereon, travels from the serving head 107 to the corrugating and forming device 35 (Fig. 4), which corrugates the copper strip 36 and forms the corrugated strip around the cable to form a longitudinally extending conductive shield on the cable. The copper strip 36 is advanced from a pad 110 thereof by corrugating rolls 111—111, which are driven from the line shaft 51 through a clutch (not shown). The rolls 111—111 corrugate the strip and advance it therebetween, and the corrugated strip passes over a guide roll 112, a floating feeler 115 and a guide roll 116. The corrugating rolls 111—111 advance the corrugated strip 36 at a rate of speed greater than the rate of speed at which the cable 20 is advanced, at which latter rate the strip 36 is applied to the cable, so that slack accumulates in the portion of the strip between the corrugating rolls 111—111 and the cable 20. When a predetermined amount of slack in this portion of the strip has accumulated, the feeler 115, which is counterweighted, drops into engagement with a microswitch 117 and the microswitch is actuated. The microswitch 117 is associated with a solenoid (not shown), which when actuated by the microswitch causes the clutch driving the corrugating rolls 111—111 to be disengaged so that the rolls 111—111 stop. As the slack in this portion of the strip 36 is used up, the strip raises the feeler 115 and moves it into engagement with a microswitch 120, which causes the clutch to be reengaged so that the corrugating rolls 111—111 restart and advance and corrugate the strip 36. Thus, excess slack of or tension upon the strip 36 are prevented.

The corrugated strip 36 and the cable 20 are advanced through sets of forming rolls 121, 122, 123, 124 and 125, which gradually form the strip 36 transversely into the shape of a U. Guides 126 and 127 hold the edges of the strip 36 in an open position between the set of forming rolls 125 and a set of forming rolls 128. The set of forming rolls 128 serves to further form the strip 36 around the cable and to partially tuck an edge 136 of the strip under an edge 135 thereof. A support 130 guides the strip 36 and the covered cable 20 into a set of horizontally disposed rolls 131, which tuck the edge 136 of the strip 36 further under the edge 135 thereof. Vertically disposed forming rolls 132—132 lap the edge 135 over the edge 136 of the strip 36 so that the cable 20 is completely enclosed in the formed copper strip 36 and the strip shields the cable.

The thermoplastic cement applicator 37 discharges thermoplastic insulating and waterproofing cement upon the cable 20 at a point to the right of the guide 126, as viewed in Fig. 4, and the cement flows around the cable and is retained in the U-shaped portion of the strip 36. The portions of the cable 20 and the strip 36 passing from the set of forming rolls 125 to beyond the final forming rolls 132—132 are enclosed in an oven 140, which has steam coils 137—137 therein. The steam coils 137—137 heat the oven to a high temperature, and are controlled thermostatically to regulate the temperature of the oven 140 so that the cement applied to the cable 20 by the applicator 37 is prevented from congealing whenever the apparatus is stopped. Hence, the cement flows completely around the cable 20. The oven 140 is of particular importance when the advancement of the strip 36 and the cable 20 is stopped because it prevents congealing of and keeps fluent the thermoplastic cement in the portion of the strip 36 which is not completely wrapped around the cable.

The cement applicator 37 delivers cement to the cable 20 at a rate slightly in excess of that needed to thoroughly cement the strip to the cable and to thoroughly insulate the cable 20 from the copper strip 36, and the excess cement is squeezed out of the formed strip 36 by the forming rolls 132—132 when they complete the wrapping of the strip 36 around the cable. The high fluidity of the cement on the portion of the cable in the oven 140 permits it to flow easily, and when the strip 36 is formed completely around the cable by the forming rolls 131 and 132—132, the cement is distributed uniformly around the periphery of the cable 20 and fills the space between the strip and the cable.

Figure 10:
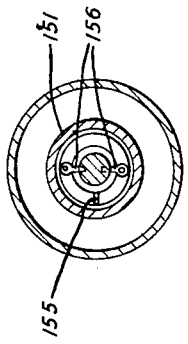
Fig. 10 is an enlarged, vertical section taken along line 10—10 of Fig. 9.
Figure 9:
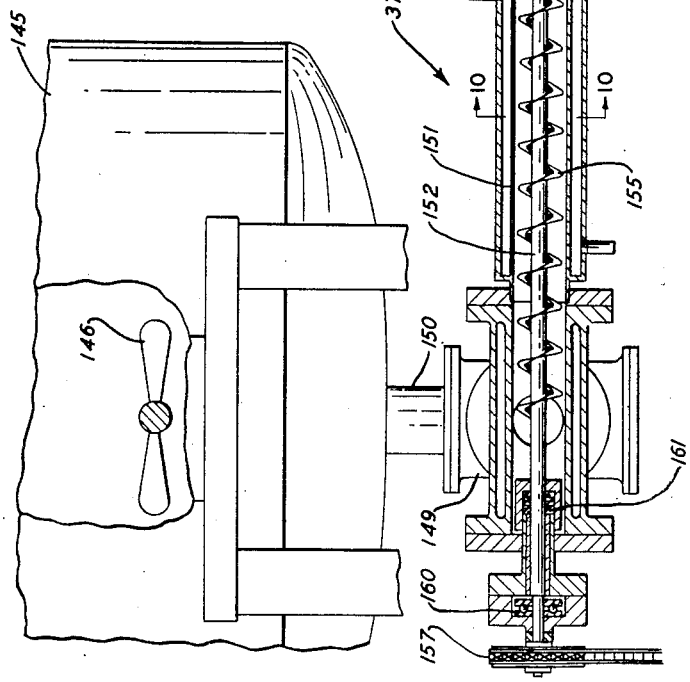
Fig. 9 is an enlarged, fragmentary, vertical section taken along line 9—9 of Fig. 4.

The cement applicator 37 includes a steam-jacketed melting kettle 145 having positioned in the lower portion thereof an agitator 146 driven by an electric motor 147 for stirring the cement therein. A steam-jacketed conduit 150 (Fig. 9) extends from the bottom of the melting kettle 145 to a manually operable valve 149, which is connected to a steam-jacketed conduit 151. A conveyer shaft 152 having a helical ribbon 155 fastened thereto by arms 156—156 (Fig. 10) is rotated by a sprocket 157 driven by the line shaft 51 (Fig. 4) through a variable speed unit (not shown) in synchronization with the capstan 45 (Fig. 5). The left end of the shaft 152, as viewed in Fig. 9, is mounted in a thrust bearing 160, and a packing gland 161 seals the interior of the conveyer conduit 151 from the atmosphere.

The helical ribbon 155 is spaced a short distance from the shaft 152, and likewise is spaced a short distance from the conduit 151 so that the ribbon urges rather than positively forces the cement along the conduit and agitates the cement to keep its fluidity high. The helical ribbon 155 urges the hot cement along the conduit 151 to a steam-jacketed strainer 162, which is disclosed fully and claimed in copending application Serial No. 671,839, filed May 23, 1946. The strainer includes a split removable screen 165, which has a straight portion 166 and a slanting portion 167. The screen 165 strains any oversized matter such as large lumps, or the like, from the cement, which is forced through the screen. The slanting portion 167 of the screen 165 directs strained matter downwardly into a sump 168 of the strainer. A bottom plate 169 may be detached from the strainer 162 to remove the split screen 165 for cleaning or repair, if necessary. A discharge pipe 170 is secured in a tapped bore 171 formed in the plate 169, and a valve 172 threaded over the discharge pipe may be opened to drain strained matter out of the strainer 162.

The strained cement is advanced from the strainer 162 through a steam-jacketed conduit 173, which contains a spider 174 supporting a bearing 179, and through an entry port 175 of a steam-jacketed constant displacement pump 176. The pump 176 includes a body 177 enclosed in a steam jacket 178, which heats the pump to keep the fluidity of the thermoplastic cement high. The pump 176 is of a type operating on the tri-rotor principle and includes a rotor 180, which is fastened to the conveyer shaft 152 by a coupling 181. A piston 182 and a shuttle 183 of the pump 176 are rotated by the rotor 180, and positively feed for a constant speed of rotation of the rotor a constant quantity of cement per unit of time from the entry port 175 of the pump 176 to a discharge port 185 thereof. The operation of the rotor, the piston and the shuttle are identical with the operation of the corresponding elements in a pump manufactured by the Yale and Towne Mfg. Co., and designated 200-A. The helical ribbon 155 is spaced sufficiently from the conveyer conduit 151 and the shaft 152 to permit slippage of the cement so that it agitates the cement to promote fluidity of the cement. However, the ribbon 155 propels the cement through the conduit 151, and keeps the entry port 175 of the pump 176 filled with cement so that the discharge of the pump 176 is uniform.

The cement forced through the discharge port 185 of the pump 176 passes through a pipe 186 connecting the pump 176 to a steam-jacketed filter 187, which includes an open-end steam-jacketed cylinder 190 and a plug 191 threaded into the open end of the cylinder. A screen basket 192 having a handle 193 and a rim 194 is supported in the cylinder 190 by lugs 195—195 projecting from the interior of the cylinder, which engage the rim 194 of the basket. The cement is forced from the filter, which screens out any oversized particles into the basket 192, through a steam-heated discharge pipe 200 and through a steam-heated valve 201, which is pneumatically controlled by an air valve 202. The valve 201, the air valve 202 and the elements associated therewith are disclosed and claimed in copending application Serial No. 671,836, filed May 23, 1946. The cement flows through the valve 201 onto a V-shaped divider 205, which is positioned over the portion of the cable 20, which is enclosed in the portion of the strip 36 formed into the shape of a U. Thus, the cement flows onto the cable and into the strip 36 on opposite sides of the centerline of the cable 20 and is carried with the strip 36 and the cable as the strip 36 is completely formed around the cable.

Figure 12:
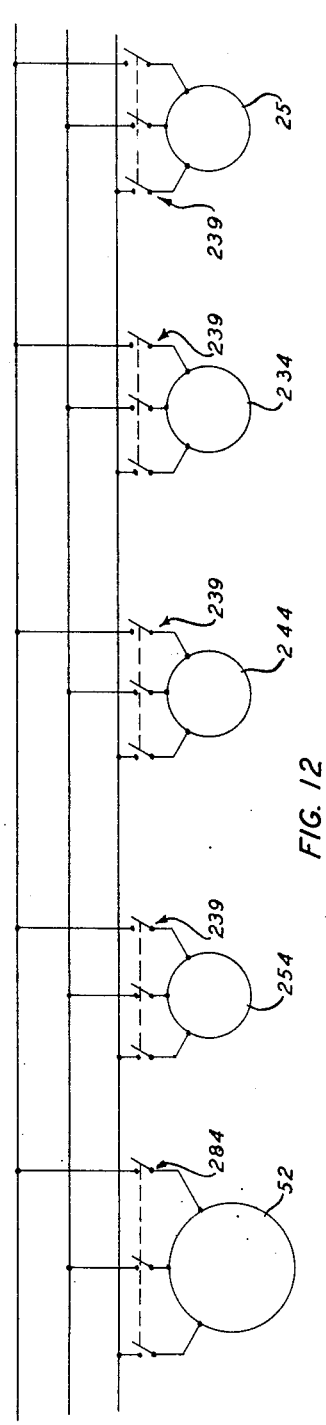
Fig. 12 is a schematic view of a portion of the electrical circuit.
Figure 11:
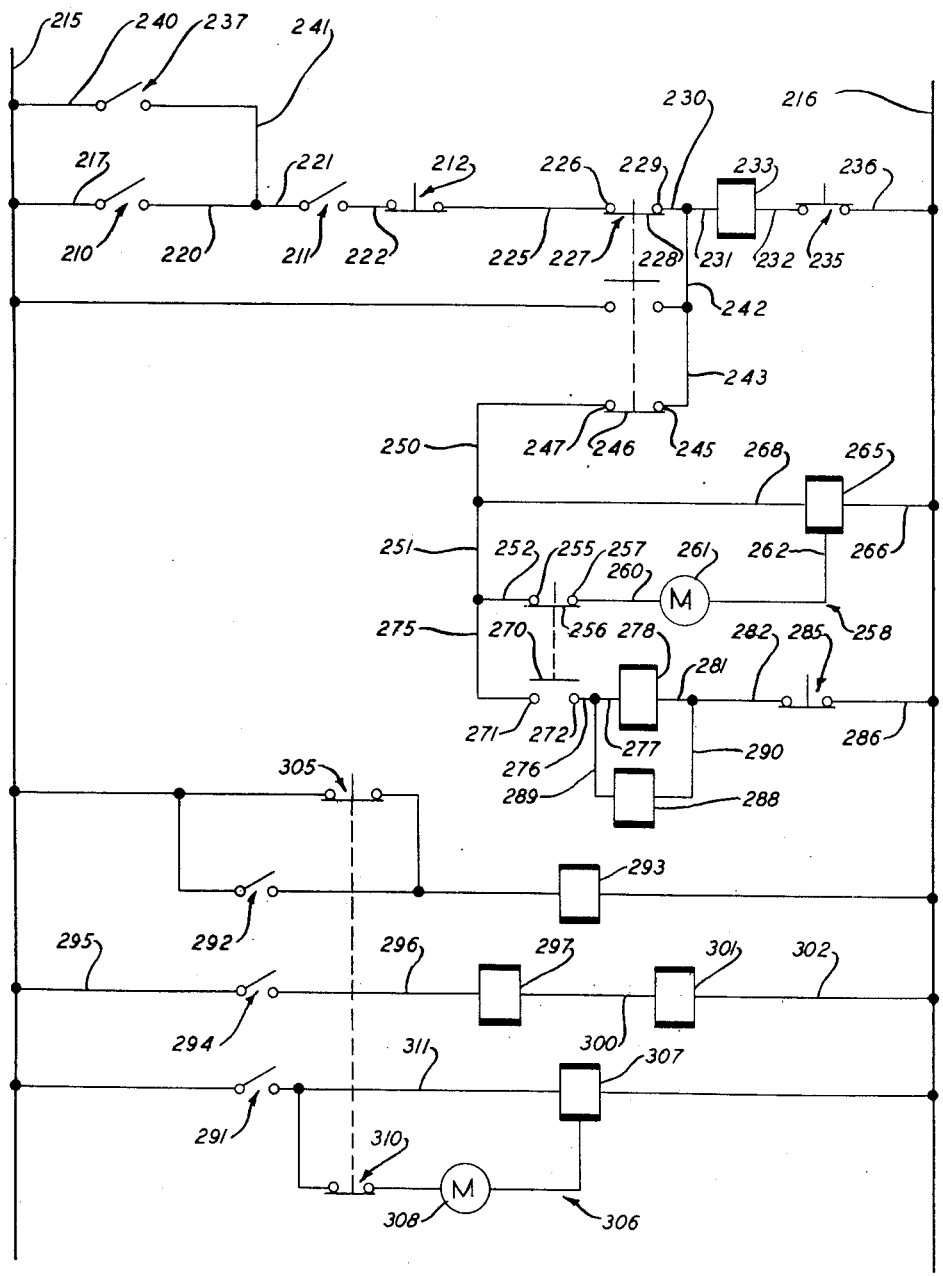
Fig. 11 is a schematic view of a portion of an electrical circuit of the apparatus.

An electrical circuit for controlling the apparatus described hereinabove is shown in Figs. 11 and 12, and includes a normally open drum switch contact 210, a toggle switch 211, and a safety switch 212. To start the main motor 52, the switch contact 210 and the switch 211 are closed. Electrical current then flows from a conductor 215 of a power line, which also includes a conductor 216, through a conductor 217, the switch 210, conductors 220 and 221, the switch 211, a conductor 222, the switch 212, a conductor 225, a contact 226 of a testing switch 227, a contactor 228 of the switch 227, a contact 229 of the switch 227, conductors 230 and 231, a relay winding 233, a conductor 232, an overload switch 235, and a conductor 236. This energizes the winding 233 and closes a holding switch 237, which is connected in parallel with the switch 210 by conductors 240 and 241 so that the drum switch 210 may be opened without breaking the circuit, and also closes relay switches 238—239 (Fig. 12). When the switches 238—239 are closed, motors 25, 234, 244 and 254 of the flooding tanks 24 (Fig. 1), 32 (Fig. 2), 38 (Fig. 4), and 42 (Fig. 5), respectively, are started so that the flooding tanks begin to operate.

Current also flows through a conductor 242 (Fig. 11) connected to the conductors 230 and 231, a conductor 243, a contact 245, a contactor 246 and a contact 247 of the testing switch 227, conductors 250, 251 and 252, a contact 255, a contactor 256 and a contact 257 of an adjustable timer 258 of a well-known type, a conductor 260, an electric motor 261 of the timer 258, a conductor 262, a winding 265 of a clutch-controlling solenoid of the timer 258 and a conductor 266 connected to the conductor 216 of the power line, and also through a conductor 268 from the conductor 250 to the winding 265. This energizes the timer motor 261 and the solenoid winding 265 of the timer 258 and starts the timer motor 261.

When the timer motor 261 is running, the flooding tank motors 25, 234, 244 and 254 drive the flooding tank pumps (not shown) and insure that the materials in the flooding tanks 24, 32, 38 and 42 are fluent. After a predetermined period of time has elapsed, the timer 258 (Fig. 11) moves the contactor 256 out of engagement with the contacts 255 and 257, and moves a contactor 270 into engagement with contacts 271 and 272 of the timer 258. This closes a circuit from the conductor 251 through a conductor 275, the contact 271, the contactor 270, the contact 272, conductors 276 and 277, a relay winding 278, conductors 281 and 282, an overload switch 285 and a conductor 286 to the conductor 216 of the power line. This energizes the relay winding 278, which closes a relay switch 284 (Fig. 12) to start the main motor 252 and the apparatus described hereinabove. Thus, the timer 258 prevents the operation of the main motor 252 until the flooding tank motors 25, 234, 244 and 254 have been in operation a predetermined period of time.

When the timer 258 (Fig. 11) moves the contactor 270 into engagement with the contacts 271 and 272, it also moves the contactor 256 out of engagement with the contacts 255 and 257, whereby the circuit to the timer motor 261 is broken, and the timer motor 261 is deenergized. The conductor 268 in parallel with the timer motor 261 to the winding 265 of the clutch-controlling solenoid of the timer 258 maintains the energization of the winding 265 even after the contactor 256 is moved out of engagement with the contacts 255 and 257 so that the contactor 270 is held in engagement with the contacts 271 and 272 and the circuit to the relay winding 278 holding the relay switch 284 closed is kept closed.

When the main motor 52 is energized, as described hereinabove, a relay winding 288, connected in parallel with the relay winding 278 by conductors 289 and 290, is energized. The relay winding 288 opens a normally closed switch 291 of that relay and closes a normally open switch 292 of that relay. When the switch 292 is closed, a relay winding 293 of another relay is energized whereby a switch 294 of the last-mentioned relay is closed. When the switch 294 is closed the following circuit is completed between the conductors 215 and 216 of the power line: a conductor 295, the switch 294, a conductor 296, a winding 297 of the solenoid 103 (Fig. 3), a conductor 300 (Fig. 11), a solenoid winding 301 and a conductor 302.

When the solenoid winding 297 is energized it operates the solenoid 103, which causes the valve 102 to be opened so that thermoplastic cement is applied to the edge 105 of the tape 34 by the cement applicator 101. The solenoid winding 301 is a part of a solenoid (not shown) controlling the air valve 202 (Fig. 9) of the cement applicator 37, and when it is energized that solenoid actuates the air valve 202 to open the valve 201 so that cement is discharged upon the V-shaped divider 205 and flows down upon a portion of cable 20 directly beneath the divider 205. The valves 201 and 102 (Fig. 3) are opened and the line shaft 51, which drives the conveyer shaft 152 (Fig. 9), the constant displacement pump 176 (Fig. 9) and the cable advancing capstan 45 (Fig. 5), are started substantially simultaneously so that the cement is applied to the tape 34 by the cement applicator 101 and cement is discharged upon the cable 20 and the copper strip 36 (Fig. 4) simultaneously with the start of the advancement of the cable 20, the tape 34 and the copper strip 36 through the apparatus.

When either the switch 211 (Fig. 11) or the switch 212 is opened, the circuit to the relay winding 233, the relay winding 278 and the relay winding 288 is broken thereby deenergizing the motors 25, 52, 234, 244 and 254. When the main motor 52 is deenergized the drive shaft 51 (Fig. 4) is stopped so that the capstan 45 (Fig. 5), the conveyor shaft 152 (Fig. 9) and the pump 176 are not driven. However, the capstan 45 (Fig. 5) and the line shaft 51 coast after the deenergization of the main motor 261, and the cable 20, the copper strip 36 (Fig. 4) and the tape 34 (Fig. 3) are advanced slightly through the apparatus during the period that they are coasting. To insure that the valve 102 and the valve 201 (Fig. 9) remain open as long as the cable 20 moves through the apparatus, an adjustable timer 306 of a well-known type is provided. When the main motor 52 (Fig. 12) is stopped by opening the switch 211, or the switch 212, to deenergize the relay winding 278, the relay winding 288 is deenergized so that the switch 291 thereof closes and the switch 292 thereof opens. However, a switch 305 of the timer 306 in parallel with the relay switch 292 remains closed so that the relay winding 293 remains energized to hold the switch 294 closed. This holds the solenoid windings 297 and 301 energized so that the valves 102 (Fig. 3) and 201 (Fig. 9) are kept open. When the switch 291 (Fig. 11) closes as the relay winding 288 is deenergized, a timer motor 308 of the timer 306 is energized and a clutch-controlling solenoid winding 307 of the timer 306 also is energized. After the timer motor 308 has been energized a predetrmind period of time, which period of time is substantially equal to that in which the capstan 45 and the line shaft 51 (Fig. 5) coast to a stop, the timer 306 opens the switches 305 and 310 thereof. When the switch 305 is opened, the winding 293 is deenergized and the switch 294 is opened. This deenergizes the solenoid windings 297 and 301 so that the valves 102 (Fig. 3) and 201 (Fig. 9) are closed. When the switch 310 is opened by the timer 306, the motor 308 of this timer is deenergized, but the clutch-controlling solenoid winding 307 of the timer 306 remains energized from a conductor 311 in parallel with the switch 310 and the motor 308 so that the switches 305 and 310 are kept open until the apparatus is restarted, at which time the relay switch 291 is opened and the solenoid winding 307 is deenergized so that switches 305 and 310 close.

In the operation of the apparatus described hereinabove, first the switches 210 and 211 are closed. This starts the motors 25, 234, 244 and 254 and the timer 256. After a predetermined period of time has elapsed, the main motor 52 is started by the timer 256 and the relay winding 278, and the relay winding 288 is energized so that the switch 291 is opened, which deenergizes the clutch-controlling solenoid winding 307, and the switch 292 is closed. This energizes the relay winding 293, which closes the relay switch 294 to energize the solenoid windings 297 and 301. The valve 102 (Fig. 3) and the valve 201 (Fig. 9) then are opened. The starting of the main motor 52 starts the line shaft 51 (Fig. 5), which drives the capstan 45 to advance the cable 20 through the apparatus and also drives the conveyer shaft 152 (Fig. 9) and the pump 176 to force cement through the valve 201 onto the cable 20. Hence, the opening of the valves 102 and 201 is simultaneous with the start of the line shaft 51.

The cable 20 is advanced through the flooding tank 24 (Fig. 1) and the tape applicator 30. The tape applicator 30 forms the thermoplastic tape 31 around the cable 20, seals the edges thereof together and binds the tape 31 tightly around the cable 20 with the cords 91—91, which are applied over the tape 31. The thermoplastic cement on the cable sticks the tape 31 to the cable. The composite cable including the cords 91—91 and the tape 31 travel from the serving head 90 through the flooding tank 32, which covers the exterior of the tape 31 and impregnates the cords 91—91 with thermoplastic cement. The cable next travels through the second thermoplastic tape applicator 33 (Fig. 3), which forms the thermoplastic tape 34 around the cable with the overlapped edges 105 and 106 of the tape 34 being sealed together by cement applied to the edge 105 by the cement applicator 101. The cement between the tape 34 and the tape 31 sticks the tape 34 tightly to the tape 31. The tapes 108—108, which are wound around the tape 34 by the serving head 107, wrap the tape 34 tightly around the cable.

The built-up cable travels from the serving head 107 to the corrugating and forming device 35 (Fig. 4), which corrugates and forms the copper strip 36 into the shape of a U. The cement applicator 37 supplies the U-shaped portion of the copper strip with hot cement, and then the device 35 forms the strip completely around the built-up cable 20 with the edges 135 and 136 of the strip in overlapping positions. The resultant cable, which includes the portion of the copper strip 36 formed around the cable, then is passed through the flooding tank 38, which applies hot asphalt to the exterior of the formed copper strip, and through the serving head 40, which wraps the tape 41 thereover. The cable then passes through the flooding tank 42, which covers the tape 41 with hot asphalt, and is advanced through the whiting pit 46 (Fig. 5) by the capstan 45, after which the cable is wound upon the take-up reel 47.

When it is desired to stop the apparatus, the toggle switch 211 is opened, which breaks the circuit to the relay winding 233, the timer 256, the relay winding 278, and the relay winding 288. Deenergization of the relay winding 233 deenergizes motors 25, 234, 244 and 254, and deenergization of the relay winding 278 deenergizes the main motor 52. The solenoid winding 265 is deenergized so that the contactor 256 moves back into engagement with the contactors 255 and 257 of the timer 258, and the contactor 270 moves out of engagment with the contacts 271 and 272 of the timer 258 so that the motor 261 of the timer 258 may be restarted when the apparatus again is started.

When the relay winding 288 is deenergized, the switch 291 recloses to start the timer 306 and the switch 292 is opened. When the timer 306 has run a predetermined period of time, which time is equal to that of the coasting time of the capstan 45 (Fig. 5) and the line shaft 51, the timer 306 (Fig. 11) opens the switches 305 and 310 thereof. The opening of the switch 305 deenergizes the solenoid windings 297 and 301, which cause the valve 102 (Fig. 3) of the cement applicator 101 to close and the valve 201 (Fig. 4) of the applicator 37 to close. The clutch-controlling solenoid winding 307 (Fig. 11) remains energized and holds the switches 305 and 310 open until the apparatus described hereinabove is restarted at which time the relay switch 291 is opened, the switches 305 and 310 are closed, and the switch 292 closes to close the circuit to the relay winding 293.

The thermoplastic cement applicator 37 serves to apply hot cement to the cable 20 at a rate of flow bearing a predetermined relationship to the rate at which the copper strip 36 and the cable 20 are advanced under the divider 205 so that a uniform coating is applied to the cable 20. The strainer 162 strains large debris from the cement being applied to the cable 20 and protects the pump 176 from abrasion from such debris. The filter 187 filters the cement forced from the pump 176 at a point just before the cement is applied to the cable 20 so that any lumps of the cement, which may have been formed in passing from the strainer 162 to the filter 187, are strained from the cement being applied to the cable. The helical ribbon 155, which is spaced away from the conveyer shaft 152 and which is spaced away from the inner wall of the conduit 151, urges the cement to the pump 176 so that the pump 176 operates under full capacity. The applicator 37 also is suitable for handling other viscous materials, such as asphalt or the like.

The steam-jacket pump 176 keeps the cement hot so that it does not congeal, and pumps a uniform quantity of cement per unit of lengths of the cable. The loose fitting conveyer ribbon 155 urges the cement along the conduit 151 without damage to the material conveying elements since the material may escape somewhat between the inner edge of the ribbon and the conveyer shaft 152 and the outer edge of the ribbon and the conduit. However, the conveyer ribbon 155 has a sufficiently strong urging action on the cement to keep the entry port 175 of the valve 176 filled with the material.

The operations of the conveyer shaft 152, the conveyer ribbon 155 and the steam-jacketed constant displacement pump 176 are coordinated precisely with the operation of the capstan 45 (Fig. 5) so that the applicator 37 discharges cement onto the cable 20 even when the capstan 45 coasts to a stop.

What is claimed is:

1. An apparatus for pouring molten plastic material onto a cable, which comprises means for advancing a cable along a predetermined path, a heated conduit leading toward the cable, a shaft extending longitudinally in the conduit, a helical band fastened to the shaft and fitting loosely in the conduit, means for turning the shaft whereby the helical band urges the material along the conduit toward the cable, a heated constant displacement pump positioned in communication with the discharge end of the conduit, means for driving the constant displacement pump from the shaft, means for discharging the material in a freely flowing stream upon the cable at a predetermined point in the path thereof, and means for driving the cable-advancing means and the shaft-driving means in synchronization so that a uniform quantity of the material is applied to the cable per unit of length thereof.

2. An apparatus for pouring molten plastic material onto a cable, which comprises means for advancing a cable along a predetermined path, a melting kettle for melting a supply of plastic material, a steam-jacketed conduit leading from the melting kettle of the cable, a shaft extending longitudinally in the conduit, a helical band fastened to the shaft and fitting loosely within the conduit, means for turning the shaft so that the helical band urges the material along the conduit away from the melting kettle, a steam-jacketed, constant displacement pump positioned in communication with the discharge end of the conduit for pumping the material from the conduit, means for driving the constant displacement pump from the shaft, means for discharging in a freely flowing stream the material upon the cable at a predetermined point in the path thereof, and means for driving the cable-advancing means and the shaft-driving means in synchronization so that a uniform quantity of the material is applied to the cable per unit of length thereof.

3. An apparatus for applying plastic material to cables, which comprises a supply tank for holding a supply of melted plastic material, a heated conduit extending from the supply tank, a shaft mounted axially in the conduit, a helical ribbon fastened to the shaft, the outer edge of said ribbon being spaced substantially from the inner periphery of the conduit so that when the shaft and the ribbon are rotated the ribbon merely urges the plastic material along the conduit, a constant displacement pump at the exit of the conduit driven by the shaft, means for guiding the material from the pump, and means for advancing a cable past the discharge end of said material-guiding means.

LEROY W. LOVETT.
SLOAN S. SHERRILL.
AUGUST STIEGLER.

REFERENCES CITED

The following references are of record in the file of this patent:

UNITED STATES PATENTS

| Number | Name | Date |
|---|---|---|
| 275,408 | Philips et al. | Apr. 10, 1883 |
| 306,516 | Philips et al. | Oct. 14, 1884 |
| 896,986 | Glass | Aug. 25, 1908 |
| 1,681,566 | Anderegg | Aug. 21, 1928 |
| 2,062,124 | Flaws | Nov. 24, 1936 |
| 2,200,933 | Nystrom | May 14, 1940 |
| 2,340,207 | Sherrill et al. | Jan. 25, 1944 |
| 2,354,260 | Haney et al. | July 25, 1944 |
| 2,372,645 | Barmack | Apr. 3, 1945 |
| 2,393,678 | Graham | Jan. 29, 194 |
| 2,394,066 | Kauth | Feb. 5, 194 |
| 2,418,540 | Bressler | Apr. 8, 194 |
| 2,428,284 | Krogel | Sept. 30, 194 |